(12) United States Patent
Mailk et al.

(10) Patent No.: US 6,925,163 B2
(45) Date of Patent: Aug. 2, 2005

(54) SYSTEM AND METHOD FOR PERFORMING A TASK WITH TELEPHONE LINE SETTINGS ON A SWITCH THROUGH A TELEPHONE CALL

(75) Inventors: Dale W. Mailk, Dunwoody, GA (US); Robert A. Koch, Norcross, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/702,650

(22) Filed: Nov. 7, 2003

(65) Prior Publication Data

US 2004/0096047 A1 May 20, 2004

Related U.S. Application Data

(62) Division of application No. 09/444,710, filed on Nov. 24, 1999, now Pat. No. 6,718,027.

(51) Int. Cl.[7] .............................. H04M 7/00; H04M 3/42
(52) U.S. Cl. ............................ 379/221.08; 379/207.02; 379/207.11
(58) Field of Search ...................... 379/207.02, 207.11, 379/142.03, 201.05, 127.03, 29.01, 219, 220.01, 221.08, 229, 230; 370/428

(56) References Cited

U.S. PATENT DOCUMENTS

| | | | |
|---|---|---|---|
| 5,379,383 A | 1/1995 | Yunoki | |
| 5,644,619 A | 7/1997 | Farris et al. | |
| 5,701,301 A | 12/1997 | Weisser, Jr. | |
| 5,774,533 A | 6/1998 | Patel | |
| 5,864,612 A | 1/1999 | Strauss et al. | |
| 6,058,175 A | 5/2000 | Schultz | |
| 6,393,278 B1 * | 5/2002 | Buchanan et al. | 455/426.1 |
| 6,697,461 B1 * | 2/2004 | Middleswarth et al. | 379/88.24 |

* cited by examiner

*Primary Examiner*—Benny Tieu
(74) *Attorney, Agent, or Firm*—Withers & Keys, LLC

(57) ABSTRACT

The present invention discloses an automated system for retrieving, delivering and modifying subscriber line settings through requests from a maintenance technician to a telephone service provider's ("telco's") systems. The system and method disclosed utilizes standard AIN queries, call setup messages and information delivery services thereby avoiding the need to use a terminal interface into the telco's systems. The technician enters data in response to prompts from a service node communicating with the technician via a telephone call. The service node sends the technician's request to a service control point which forwards the call to the switch serving the subscriber's line to be analyzed or modified. The switch responds to instructions provided by the service control point to effectuate the technician's request and sends the results to a telephone line designated by the technician.

19 Claims, 3 Drawing Sheets

SYSTEM AND METHOD FOR PERFORMING A TASK WITH TELEPHONE LINE SETTINGS ON A SWITCH THROUGH A TELEPHONE CALL

This is a Divisional application of U.S. application Ser. No. 09/444,710 filed Nov. 24 1999, now U.S. Pat No. 6,718,027.

BACKGROUND

1. Field of the Invention

The present invention relates generally to telecommunications systems. More particularly, the present invention relates to an advanced intelligent network system for facilitating troubleshooting problems related to provisioning telephone services and features.

2. Background of the Invention

In the present telecommunications infrastructure, subscribers are provided a wide range of improved services and special features in addition to regular plain old telephone service ("POTS"). Examples of such enhancements include caller-id, call-waiting, automatic call-back, message waiting, anonymous call rejection, automatic re-call, and the like. Such enhancements are provided through a complex set of interactions between the various network elements. The complexity of the interactions is greatly increased when a single subscriber utilizes multiple features.

When a subscriber subscribes to a new service, one or more of the following actions may be executed: an AIN trigger may be placed on the subscriber's line at a service switching point ("SSP"); a database on a service control point ("SCP") may be updated with additional information; and/or a database on a service node ("SN") may be updated. When a new service or feature is being offered system-wide, the SN or SCP may require new programming logic, or AIN triggers may be provisioned globally on the SSP. Because of the complexity and large number of combinations of data and programming options, problems sometimes arise with a subscriber's telephone service.

When a subscriber reports such problems to a service center, diagnosis and correction using conventional systems and methods is a multi-step process. A trouble ticket is created and assigned to a maintenance technician. The maintenance technician must login to the subscriber's SSP to analyze the settings on the subscriber's line. The technician must then diagnose the problem and implement corrective actions. Finally, the technician must verify that the problem is resolved, either by testing the subscriber's line or by asking the subscriber to test the line.

In conventional systems, access to switching equipment is generally restricted to special terminals physically located on the telephone service provider's ("telco's") premises. In some instances, the telco may allow remote terminal access via a secure access interface. Furthermore, conventional switching systems generally have only a limited number of ports available for technicians logging in. Thus, when a technician logs into a switching system to diagnose a single subscriber's problem, a valuable interface port is tied-up. This limits the number of ports available to diagnose and resolve any problems affecting users system-wide.

Additionally, telecommunication system vendors typically provide rudimentary user interfaces with their systems. Thus, using conventional methods, maintenance technicians must have the specialized skills and knowledge to effectively interact with the switching systems. Such specialized skills and knowledge are generally vendor-specific, making it more difficult for the technician to diagnose and correct problems when systems from multiple vendors are deployed in the telco's network.

There is therefore a need for a system and method allowing a technician to perform tasks with telephone line settings without the need for logging into the telco's systems. More specifically, there is a need for a system and method allowing a technician to retrieve or modify the telephone line settings on the switch through a telephone call. Further there is a need for automated diagnosis of common problems associated with telephone services and features.

SUMMARY OF THE INVENTION

The present invention utilizes an Advanced Intelligent Network ("AIN") to provide an automated system and method for performing tasks with telephone line settings on a switch using a telephone call. The tasks such as retrieval, delivery and modification of telephone line settings may be performed using the system and method of the present invention. AIN systems are described in U.S. Pat. Nos. 5,701,301, 5,774,533 and Bellcore Specification TR-NWT-001284, Switching Systems Generic Requirements for AIN 0.1, which are all incorporated herein by reference in their entirety. The system and method of the present invention uses standard AIN queries, call setup messages and information delivery services.

A technician obtains the telephone line settings by placing a telephone call to a special access number for the automated system. The technician may place this call using any telephone line in the public switched telephone network. The telephone line need not be a land-based line, i.e., the technician's telephone line may be a mobile line if desired. The special access number is provisioned with a suitable AIN trigger on a switch operated by the telco. As a security measure, the system requests an authorization code or PIN from the caller to prevent unauthorized access to the telco's systems. After verifying the caller's authorization to use the system, the call is forwarded to a service node which prompts the technician to provide information required to retrieve, deliver and modify the data for a particular telephone line.

When line settings are being requested, it is desirable for the technician to place the telephone call to the special access number using one telephone line and to receive the results using a second telephone line having calling number and/or calling name delivery. Essentially, the technician's call is terminated to the second telephone line as if the technician had dialed that line directly. However, rather delivering the technician's true calling number or calling name, the test results data or a text message identifying the results are delivered to the second line. Thus, three pieces of information are gathered by the service node: a telephone number that is to be tested, a test code and a telephone number for receiving the test results. When the subscriber line data is being modified, the technician need only provide the telephone number for the line to be modified and a modify code indicating the parameters to be changed.

The technician may enter the information required using any suitable means, e.g., a touch tone phone, a computer or an automated dialer. In a preferred embodiment, the service node "walks" the technician through a series of questions regarding the reported trouble and uses the technician's responses to formulate the test code or the modify code as the case may be. The service node transmits the information provided by the technician to the service control point. The service control point uses this information to determine the actions necessary to carry out the technician's instructions. The service control point modifies the call parameters to flag the call as a request from the automated system of the present invention. The service control point also modifies the called party number field to route the call to the line to be tested or modified. Optionally, the service control point may ensure that the line to be tested or modified has an active Termination Attempt Trigger ("TAT") or other suitable AIN trigger. This can be accomplished by sending an Update_Request message to the switch serving the line.

The call is forwarded to the service switching point serving the line to be tested or modified. The trigger on the line is encountered prompting that switch to issue a database query back to the service control point. When the service control point receives the query, the flag indicates that the call is really a request for retrieval, display or modification of the switch settings for the called line. Thus, the service control point instructs the switch to either retrieve the requested data or to modify the data fields for the line, according to the flag.

If the instruction relates to modification of line data, the service control point responds to the database query by instructing the switch to end the call. If the instruction relates to retrieval of line data, the service control point responds to the query by writing a test results code in the calling party field of the call, and re-routing it to the telephone number designated by the technician to receive the test results. The switch processes the call according to the new call parameters and the call is eventually terminated to the technician's second line by the appropriate switch.

Once the call is terminated to the technician's second line, the test results may be delivered in a variety of forms. For example, a simple numeric code may be provided using a calling number delivery service. Alternatively, the code may be translated to a text string and displayed using a calling name delivery system. In another embodiment, the test code may be delivered to a computer which translates the code for the technician. In another embodiment, the code may be stored in a voice or text mailbox which the technician may retrieve at a later date.

It is an object of the present invention to provide an automated system for performing a task with telephone line settings on a switch.

It is another object of the present invention to use an Advanced Intelligent Network to provide an automated system for retrieval, delivery and modification of telephone line settings.

It is another object of the present invention to retrieve telephone line settings from a switch via a telephone call.

It is another object of the present invention to modify telephone line settings from a switch via a telephone line display service.

These and other objects of the present invention are described in greater detail in the detailed description of the invention, the appended drawing and the attached claims.

DETAILED DESCRIPTION OF THE INVENTION

As noted above, the present invention provides a system and method for performing a task with telephone line settings on a switch. The system and method are described herein with reference to the elements of an Advanced Intelligent Network ("AIN") shown in FIG. 1 and the flow charts shown in FIGS. 2a and 2b. As would be apparent to one skilled in the art, although FIG. 1 shows multiple SSPs and multiple inter-exchange carriers ("IXCs"), the present invention does not require multiple SSPs and IXCs.

Figure 1:
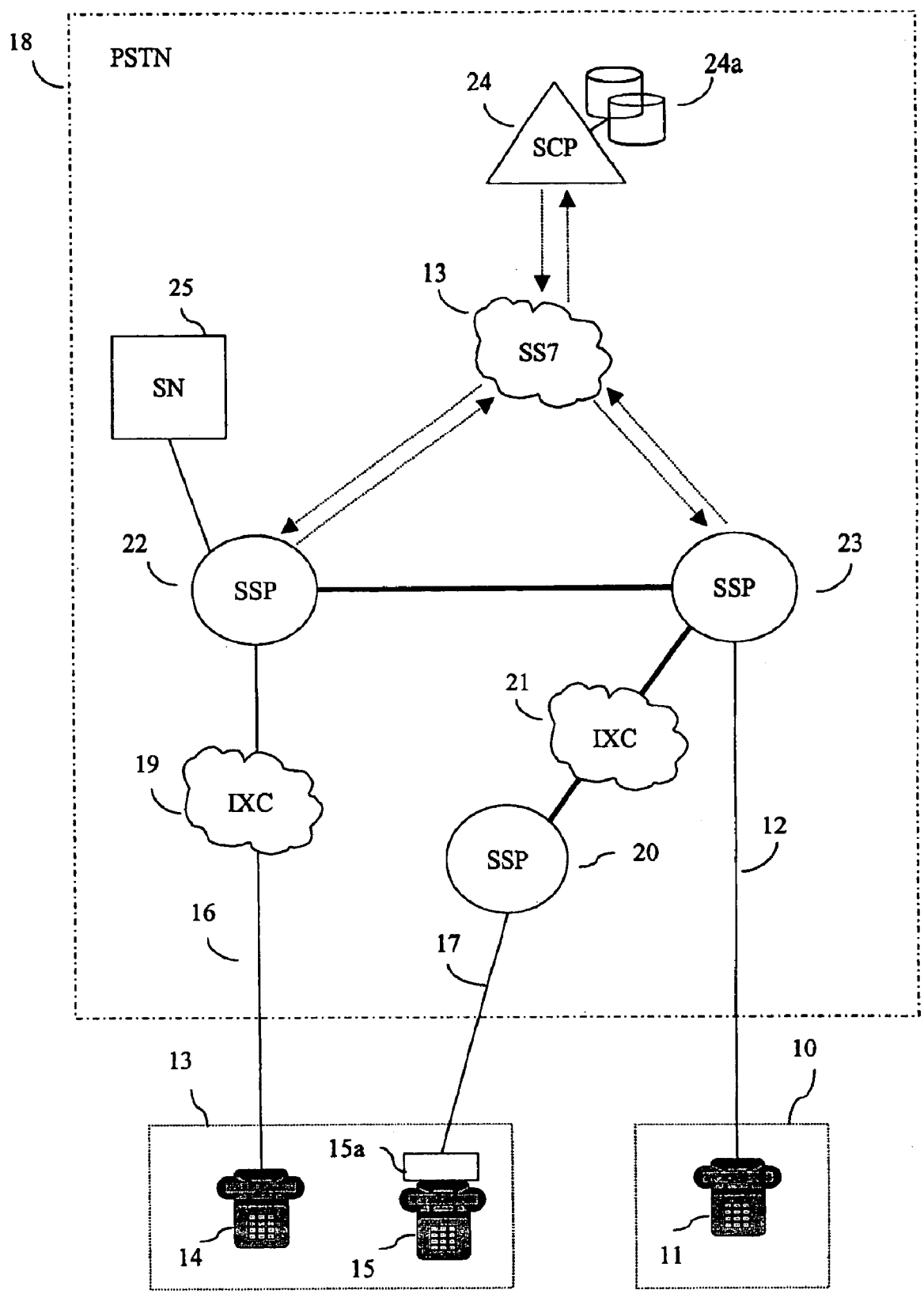
FIG. 1 is a schematic diagram showing the key components of a preferred embodiment of the present invention.
Figure 2A:
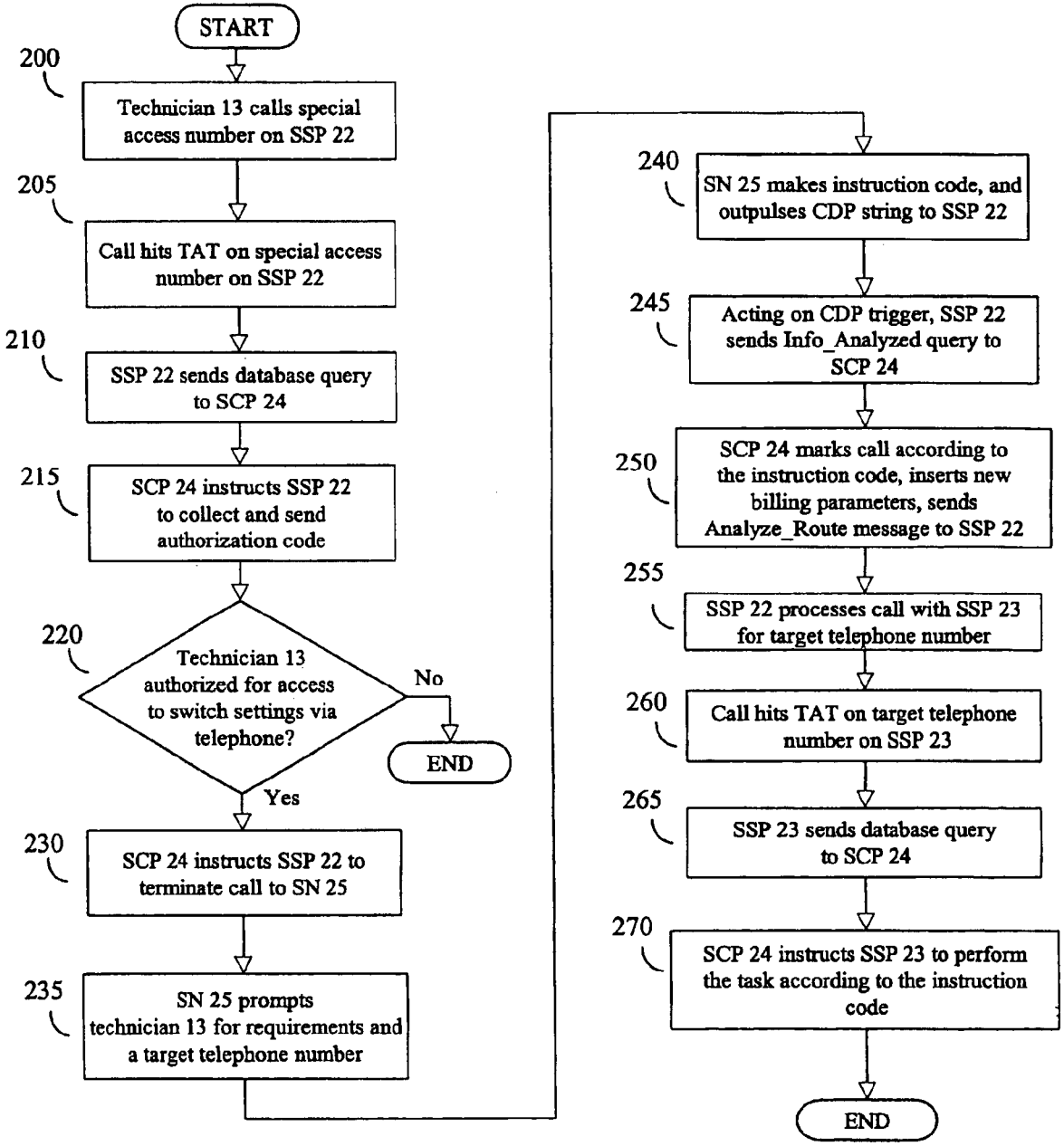
FIGS. 2a and 2b are flow charts showing the steps performed in a preferred embodiment of the present invention.

FIG. 1 shows subscriber 10 having telephone 11 connected to subscriber line 12. A problem associated with a subscribed feature on line 12 has been reported to the telco and a maintenance trouble ticket has been generated. The system and method of present invention allows technician 13 to diagnose and correct the problem using telephones 14 and 15 connected to subscriber lines 16 and 17, respectively. As shown in FIG. 1, subscriber lines 16 and 17 may be located anywhere within public switched telephone network ("PSTN") 18. In this example, subscriber line 16 is connected to IXC 19 and subscriber 17 is connected to SSP 20. SSP 20 is connected to IXC 21. IXCs 19 and 21 provide communications links to the telco's SSPs 22 and 23. As would be apparent to those skilled in the art, subscriber lines 16 and 17 need not be land-based lines, i.e., one or both of subscriber lines 16 and 17 could be wireless connections in PSTN 18. Moreover, subscriber line 16 and 17 could be directly connected to SSPs operated by the telco, i.e., IXCs 19 and 20 are not necessary components of the present invention. Finally, telephones 14 and 15 need not be co-located, i.e., one technician could initiate the call using telephone 14 and another technician could receive the results on telephone 15.

To diagnose and correct a problem with subscriber line 12, technician 13 must perform certain tasks on SSP 23 with the settings for subscriber line 12. Using the system and method of the present invention, technician 13 can perform these tasks on SSP 23 using a telephone call without the need for logging onto the switch. Technician 13 uses telephone 14 and subscriber line 16 to call a special 20 access number set up by the telco. (Step 200 in FIG. 2a). As shown in FIG. 1, the special access number in this example is a telephone number on SSP 22. In a preferred embodiment, the system ensures only authorized callers can perform tasks on the switch as described below.

The special access number on SSP 22 is provisioned with a suitable AIN trigger, e.g., a TAT, to trap the call. (Step 205). In response to the trigger, SSP 22 sends a database query to SCP 24. (Step 210). SCP 24 instructs SSP 22 to prompt the caller, i.e., technician 13, to enter a personal identification number ("PIN") or some other authorization code(s). (Step 215). SSP 22 collects the digits entered by technician 13 and transmits the collected digits to SCP 24 for verification. SCP 24 checks database 24a to verify the caller's authorization code. (Step 220). If the authorization code is not found, SCP 24 instructs SSP 22 to end the call. If the caller is authorized to proceed, SCP 24 sends an Authorize_Termination message to SSP 22 directing SSP 22 to continue call processing using the call parameters as provided by SCP 24 in the Authorize_Termination message. (Step 230). In a preferred embodiment, SCP 24 provides new billing parameters in the Authorize_Termination message. The new billing parameters allow technician 13 to call the special telephone access number from any location without incurring charges on the line from which the call is placed. In a preferred embodiment, the new billing parameters are AIN Automated Message Accounting ("AMA") parameters, including: AMAslpID, AMAAlternateBillingNumber and ChargeNumber. AIN AMA parameters are described in Bellcore TR-NWT-001100, Bellcore Automatic Message Accounting Format Requirements, Issued Feb. 2, 1993.

As noted above, SSP 22 terminates technician 13's call to SN 25. SN 25 is programmed to play a series of announcements to prompt the technician for requirements, i.e., to identify the task(s) to be performed, and the target telephone number, i.e., the 10-digit telephone number for subscriber line 12. (Step 235). In a preferred embodiment, the requirements comprise an instruction code and, if appropriate, a telephone number to deliver any output from the task. The instruction code is a numeric string of (up to ten) digits corresponding to the specific task or tasks to be performed with the line settings on the switch. For example an instruction code of "1410000000" could indicate that the required task is to retrieve and display line 12's call-forwarding status. In a preferred embodiment, SN 25 leads technician 13 through a series of cascading menus and constructs the instruction code based on the input from the technician. (Step 240). In an alternate embodiment, technician 13 uses a pre-defined list of tasks and corresponding instruction codes to input the instruction code. In another embodiment, technician 13 is provided with an automatic dialer handset with the most common instruction codes pre-programmed to speed keying in of the code.

SN 25 constructs a string, up to thirty-two digits in length, and outpulses the string to SSP 22. (Step 240). Preferably, the string has the form: CXXXXXXXXXXYYYYYYYYYYZZZZZZZZZZ#, where C is a customized dialing plan ("CDP") code for the system of the present invention, X..X is the 10-digit telephone number for the target line, Y..Y is the instruction code and Z..Z is the 10-digit output telephone number, if one is provided. As is known to those skilled in the art, the "#" character is used as a delimiter to signify the end of the string. In a preferred embodiment, C is limited to a single digit to allow for a maximum length of ten digits for the instruction code.

A CDP trigger is encountered at SSP 22 upon receipt of CDP code C. SSP 22 waits for all digits in the string to be received then sends an Info_Analyzed query to SCP 24. (Step 245). The Info_Analyzed query contains all of the digits in the string received from SN 25. Based on the value of C, SCP 24 recognizes that the call is to be handled under the system and method of the present invention.

Upon receipt of the Info_Analyzed query, SCP 24 marks the call according to the instruction code and inserts new billing parameters as discussed above. (Step 250). SCP 24 marks the call by making several changes in the calling parameters. A marker code "NNNNN" (up to 5 digits in length), is inserted in the beginning of the calling party number ("CgPN") field. The marker code is a pre-defined code indicating the call is to be handled under the system and method of the present invention. Preferably, the first digit of the marker code is either "0" or "1" to distinguish the number from a North American Numbering Plan ("NANP") number. The remaining digits in the CgPN are changed to the output telephone number, "ZZZZZZZZZZ," if one was provided. The called party number ("CdPN") is changed to the target telephone number, "XXXXXXXXXX." Finally, the redirecting party number is changed to the instruction code, "YYYYYYYYYY." SCP 24 sends an Analyze_Route message with the new calling parameters to SSP 22. (Step 250). Because the CdPN was changed to the target telephone number, SSP 22 processes the call with SSP 23.

In a preferred embodiment of the present invention, it is assumed that all subscriber telephone lines are provisioned with a TAT. Even if the line has a TAT, the trigger may be inactive, so SCP 24 sends an Update_Request message to SSP 23 before or concurrent with the Analyze_Route response sent to SSP 22. The Update_Request message instructs SSP 23 to activate the TAT on the line corresponding to the DN under test. If subscriber line 12 is not provisioned with a TAT, technician 13's telephone call will be terminated to the line, resulting in a ring or busy state.

Figure 2B:
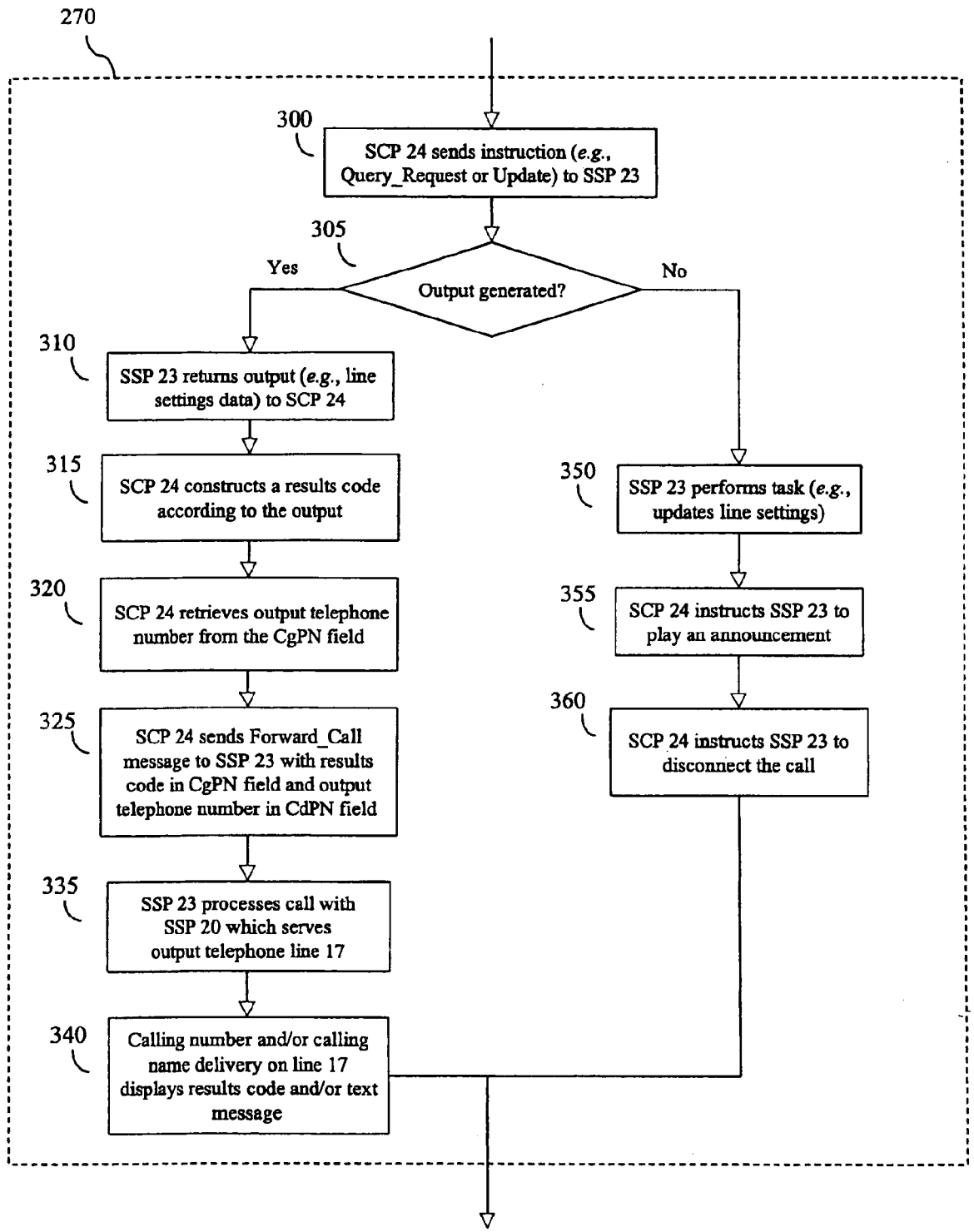

When the call arrives at SSP 23, it hits the TAT on the target telephone number. (Step 260). In response to the TAT, SSP 23 issues a query to SCP 24. (Step 265). The query contains all of the usual fields, including the changes made to the CgPN, CdPN and redirecting party number fields. When SCP 24 receives the database query from SSP 23, the marker code at the beginning of the CgPN indicates that a task is to be performed. SCP 24 determines the task(s) by examining the instruction code and the other information contained in the calling parameters. SCP 24 then issues an appropriate instruction message to SSP 23. (Step 270). If any output is generated by the instruction, SCP 24 directs SSP 23 to deliver the output to the output telephone number as described below in more detail below. If no output is expected, SCP 24 instructs SSP 23 to end the telephone call. The flow chart in FIG. 2b is an expanded description of the events that occur in step 270, depending on the nature of the task. In step 300 (in FIG. 2b), SCP 24 retrieves the instruction code from the redirecting party field to issue an appropriate instruction. In step 305, SCP 24 determines whether or not the task generates output. The first section below, describes the events when the task generates output (steps 310–340), such as when the technician requests display of the subscriber line settings. The second section describes the events when the task does not generate output (steps 350–360), such as when the technician requests a modification of the subscriber line settings on the switch.

Task with Output

As noted above, if the task to be performed with the line settings on the switch has output, the technician is prompted to enter an output telephone number as part of the requirements defining the task. (Step 235). The output telephone number indicates where the output will be delivered. In a preferred embodiment, the output telephone number corresponds to a line different from line 16, e.g., line is 17. Alternatively, the number could be the telephone number for the line from which technician 13 is placing the call, i.e., line 16. However, in this alternate embodiment, line 16 would need call-waiting with calling number or calling name delivery.

Suppose that technician 13 wants to determine the call-forwarding status for subscriber line 12. In this case, the instruction code provided to SCP 24 could be "1410000000" as discussed above. Thus, in step 300, SCP 24 sends a Query_Request message to SSP 23 providing the target telephone number and the appropriate parameters instructing SSP 23 to retrieve the call-forwarding settings for line 12. In step 310, SSP 23 returns the output of the instruction to SCP 24. SCP 24 constructs a results code according to the output data received from SSP 23. (Step 315). The results code is a string (up to 15-digits long) indicating the status of the line under test. For example, a results code of "141100000000000" could indicate that call-forwarding has not been turned on for the subscriber's line.

SCP 24 retrieves the output telephone number from the CdPN field (step 320) and sends a Forward_Call message back to SSP 23. The Forward_Call message serves as SCP 24's response to the database query (from step 265). In the Forward_Call message, SCP 24 writes the results code in the CgPN field and the output telephone, i.e., "ZZZZZZZZZZ" in the CdPN. (Step 325). SSP 23 continues processing the call using the new parameters supplied by SCP 24. (Step 335). SSP 23 forwards the call to SSP 20 since the CgPN, i.e., "ZZZZZZZZZZ," is a telephone number on SSP 20, as shown in FIG. 1. When SSP 20 terminates the call to line 17, the results code is delivered and displayed as the calling party number on display device 15a. (Step 340). Technician 13 decodes the results code to determine the line settings for subscriber line 12.

In a preferred embodiment, the results code and its translation are stored in a calling name delivery service database. In this embodiment, line 17 has calling number and calling name delivery, and display device 15a can display both the calling number and the calling name. For example, the calling name database entry for the number "141100000000" could be set to "CFWD off" to indicate that call forwarding is turned off. Thus, when the call is forwarded to the output telephone number, the results code and decoded translation are displayed to technician 13. In an alternate embodiment, line 17 is attached to a computer which receives and decodes the results code.

Task with No Output

Not all tasks performed with subscriber line settings on a switch generate output. For example, once technician 13 has diagnosed the problem, the system and method of the present invention can be used to change the settings for line 12 on the switch. Such a task does not generate output. The switch is merely instructed to make the change as requested. As noted above, SCP 24 determines the appropriate action by examining the instruction code. For example, if the task is to turn on call-forwarding for subscriber line 12, the instruction code might be "0410000000."

In this example, SCP 24 instructs SSP 23 to modify the parameters for the subscriber line by sending an Update message. (Step 300). The Update message provides the target telephone number and the instructions regarding data fields to be changed. Upon receipt of the Update message, SSP 23 updates the data fields for line 12 as requested. (Step 350). SCP 24 completes the procedure by responding to SSP 23's database query with an instruction to disconnect the call. (Step 360). In a preferred embodiment, the response from SCP 24 includes an instruction to play an announcement to technician 13 indicating that the request has been processed before disconnecting the call. (Step 355).

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A method for delivering subscriber line data from a first switch through a telephone call, comprising the steps of:
   (a) receiving a first telephone number, a second telephone number and a test code on a service control point;
   (b) retrieving the subscriber line data for the first telephone number from the first switch according to the test code;
   (c) delivering the subscriber line data to the second telephone number;
   (d) receiving the telephone call to a first telephone access number on a second switch;
   (e) receiving an authorization code on a service control point;
   (f) verifying the authorization code on the service control point; and
   (g) directing the telephone call to a second access number, said second telephone access number assigned to a service node.

2. The method of claim 1, wherein the first switch and the second switch are the same switch.

3. The method of claim 1, further comprising the steps of collecting on the service node a plurality of requirements and constructing the test code.

4. The method of claim 1, further comprising the step of activating the trigger on the first telephone number on the switch.

5. The method of claim 4, wherein the trigger is activated by sending an update request message from the service control point to the switch.

6. The method of claim 1, further comprising the step of displaying the results code on a display device connected to a telephone line assigned to the second telephone number.

7. The method of claim 1, further comprising the steps of
   (d) populating a calling name database with a plurality of results codes and corresponding message texts;
   (e) looking up the results code in the calling name database; and
   (f) displaying a message text on a display device connected to a telephone line assigned to the second telephone number.

8. A method for delivering subscriber line data from a first switch through a telephone call, comprising the steps of:
   (a) receiving a first telephone number, a second telephone number and a test code on a service control point;
   (b) retrieving the subscriber line data for the first telephone number from the first switch according to the test code;
   (c) delivering the subscriber line data to the second telephone number;
   (d) marking the telephone call as a request for subscriber line data;
   (e) forwarding the telephone call to the first telephone number, thereby encountering a trigger on the first telephone number at the first switch;
   (f) sending a database query from the first switch to the service control point in response to the trigger; and
   (g) responding to the database query on the service control point by:
      (i) instructing the first switch to send the subscriber line data according to the test code,
      (ii) writing a results code in a first portion of a telephone call setup message, and
      (iii) instructing the first switch to forward the telephone call to the second telephone number.

9. The method of claim 8, wherein the first portion of the telephone call setup message is a calling party number field.

10. The method of claim 8, wherein step 42(d) comprises the step of writing a marker in a second portion, the second telephone number in a third portion and the test code in a fourth portion of a telephone call setup message.

11. The method of claim 10, wherein the second portion of the telephone call setup message is a first portion of the calling party number field, the third portion of the telephone call setup message is a second portion of a calling party number field and the fourth portion of the telephone call setup message is a redirecting party number field.

12. A system for retrieving a plurality of subscriber line data through a telephone call comprising:

(a) a service node in communication with a first switch and a second switch, said second switch having a telephone access number provisioned with a first trigger, wherein a telephone call to the telephone access number is connected to the service node and the service node collects a test code, a first telephone number, and a second telephone number; and (b) a service control point in communication with the service node, wherein the service control point writes a marker in a first portion, the second telephone number in a second portion and the test code in a third portion of a telephone call setup message, and forwards the telephone call to the first telephone number, thereby activating a second trigger on the first switch, wherein the first switch sends a database query to the service control point, wherein the service control points responds by instructing the first switch to retrieve the plurality of subscriber line data according to the test code, wherein the first switch then sends the plurality of subscriber line data to the service control point, and wherein the service control point then writes the plurality of subscriber line data in a fourth portion of the telephone call setup message and forwards the call to the second telephone number.

13. The system of claim 12, wherein the first trigger causes the second switch to send a query to the service control point, wherein the service control point collects an authorization code, and wherein if the authorization code is valid, the service control point directs the second switch to connect the call to the service node.

14. The system of claim 12, wherein the first portion of the telephone call setup message is first portion of a calling party number field.

15. The system of claim 14, wherein the second portion of the telephone call setup message is a second portion of the calling party number field.

16. The system of claim 12, wherein the third portion of the telephone call setup message is a redirecting party number field.

17. The system of claim 12, wherein the fourth portion of the telephone call setup message is the calling party number field.

18. The system of claim 12, further comprising a means for verifying a caller's authorization code.

19. The system of claim 12, wherein the service node comprises a menu of options for selecting the test code.

* * * * *